(12) United States Patent
Okinaga et al.

(10) Patent No.: US 9,331,544 B2
(45) Date of Patent: May 3, 2016

(54) BRUSHLESS MOTOR AND METHOD OF MANUFACTURING THEREOF

(75) Inventors: Kinjirou Okinaga, Osaka (JP); Masahito Hidaka, Osaka (JP); Koji Kuyama, Hyogo (JP); Yoshio Chiba, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 326 days.

(21) Appl. No.: 13/696,202

(22) PCT Filed: Jul. 11, 2011

(86) PCT No.: PCT/JP2011/003952
§ 371 (c)(1),
(2), (4) Date: Nov. 5, 2012

(87) PCT Pub. No.: WO2012/008135
PCT Pub. Date: Jan. 19, 2012

(65) Prior Publication Data
US 2013/0057095 A1    Mar. 7, 2013

(30) Foreign Application Priority Data

Jul. 14, 2010    (JP) .................................. 2010-159421

(51) Int. Cl.
*H02K 5/22*    (2006.01)
*H02K 15/00*    (2006.01)
*H02K 3/52*    (2006.01)

(52) U.S. Cl.
CPC ................ *H02K 5/225* (2013.01); *H02K 3/522* (2013.01); *H02K 11/33* (2016.01); *H02K 15/0006* (2013.01); *H02K 2203/03* (2013.01); *H02K 2203/09* (2013.01); *Y10T 29/49009* (2015.01)

(58) Field of Classification Search
CPC ... H02K 3/522; H02K 5/225; H02K 11/0073; H02K 15/0006; H02K 2203/03; H02K 2203/09
USPC .......... 310/40 MM, 67 R, 68 B, 68 R, 71, 89; 439/465, 497, 719
IPC ............................................... H02K 5/22, 15/00
See application file for complete search history.

(56) References Cited

U.S. PATENT DOCUMENTS 3,502,917 A * 3/1970 Bizoe ..................... H02K 5/225
                                                        174/153 G
5,328,386 A * 7/1994 Frantz et al. .................. 439/465
(Continued)

FOREIGN PATENT DOCUMENTS

CN            1539192 A      10/2004
CN          101064444 A      10/2007
(Continued)

OTHER PUBLICATIONS

English language translation of Search Report in corresponding Chinese Application No. 201180034724.2, dated Aug. 18, 2014, 3 pages.
(Continued)

Primary Examiner — John K Kim
(74) Attorney, Agent, or Firm — Brinks Gilson & Lione

(57) ABSTRACT

A brushless motor includes a stator having a stator core, a rotor, a circuit board, a board holder for holding the circuit board, a motor housing having a notch at an opening, and a housing cover. The motor housing accommodates the stator, the rotor, and the board holder to which the circuit board is mounted, and the motor housing is sealed with the housing cover. The board holder includes a board mount section, a lead-wire holder for holding lead-wires. The lead-wire holder is placed at the notch of the motor housing. The lead-wires extend from the circuit board mounted to the board mount section to the outside of the motor housing via the lead-wire holder.

6 Claims, 10 Drawing Sheets

(56) References Cited

U.S. PATENT DOCUMENTS

| | | | | |
|---|---|---|---|---|
| 5,497,040 | A * | 3/1996 | Sato | 310/67 R |
| 5,767,596 | A * | 6/1998 | Stark et al. | 310/89 |
| 5,962,938 | A * | 10/1999 | Bobay et al. | 310/67 R |
| 6,166,468 | A * | 12/2000 | Suzuki et al. | 310/90 |
| 7,911,089 | B2 * | 3/2011 | Jang | F04D 25/08 310/43 |
| 8,269,380 | B2 * | 9/2012 | Amaya | D06F 37/065 310/43 |
| 2002/0030415 | A1 * | 3/2002 | Morooka | H02K 5/08 310/68 R |
| 2002/0060105 | A1 * | 5/2002 | Tominaga et al. | 180/443 |
| 2003/0160523 | A1 * | 8/2003 | Suzuki | H02K 3/522 310/43 |
| 2006/0063403 | A1 | 3/2006 | Kataoka et al. | |
| 2006/0186746 | A1 * | 8/2006 | Nanbu | H02K 11/40 310/68 R |
| 2006/0226719 | A1 * | 10/2006 | Nakanishi | H02K 7/20 310/68 B |
| 2007/0252487 | A1 * | 11/2007 | Fujii | H02K 1/146 310/68 B |
| 2009/0121566 | A1 * | 5/2009 | Ishizeki | H02K 1/148 310/71 |
| 2010/0320880 | A1 * | 12/2010 | Kamogi | H02K 11/33 310/68 B |
| 2011/0241467 | A1 * | 10/2011 | Fujioka | H02K 1/146 310/156.08 |
| 2012/0032536 | A1 * | 2/2012 | Kado | H02K 5/08 310/43 |
| 2012/0038229 | A1 * | 2/2012 | Watanabe | H02K 1/30 310/43 |
| 2012/0043862 | A1 * | 2/2012 | Furukawa | H02K 1/278 310/68 B |
| 2013/0057095 | A1 * | 3/2013 | Okinaga et al. | 310/71 |

FOREIGN PATENT DOCUMENTS

| | | |
|---|---|---|
| CN | 101617460 A | 12/2009 |
| JP | 58-109288 U | 7/1983 |
| JP | 2001-309600 A | 11/2001 |
| JP | 2003-079092 A | 3/2003 |
| JP | 2004-173393 A | 6/2004 |
| JP | 2005-341780 A | 12/2005 |
| JP | 2009-278801 A | 11/2009 |
| JP | 2010-004601 A | 1/2010 |
| WO | WO 03/015243 A1 | 2/2003 |

OTHER PUBLICATIONS

International Search Report for International Application No. PCT/JP2011/003952, dated Sep. 13, 2011, 2 pages.

* cited by examiner

BRUSHLESS MOTOR AND METHOD OF MANUFACTURING THEREOF

This application is a 371 application of PCT/JP2011/003952 having an international application date of Jul. 11, 2011, which claims priority to JP2010-159421 filed Jul. 14, 2010, the entire contents of which are incorporated herein by reference.

TECHNICAL FIELD

The present invention relates to a brushless motor of which housing includes a built-in circuit board mounted with circuit components such as a position sensor, and also includes a lead wire extending from the inside thereof to the outside, and it relates to a method for manufacturing the same motor.

BACKGROUND ART

A brushless motor with a built-in position sensor and a built-in drive-control circuit is disclosed in, e.g. Patent Literature 1, as a brushless motor with a built-in circuit board. This conventional brushless motor comprises the following structural elements:
- a hermetic cylindrical motor housing;
- a rotor having a drive magnet and accommodated in the housing;
- a stator core wound with a drive wiring and disposed around an outer circumference of the rotor, and accommodated in and fixed to the motor housing;
- a positioning section protruding from an end face of the stator core along an axial direction; and
- a circuit board mounted with a position sensor that senses a rotor position, and disposed at the positioning section such that the circuit board is positioned along the axial direction and a circumferential direction.

The foregoing structure allows the brushless motor to perform a reliable positioning.

Another brushless motor with a built-in circuit board and lead-wires extending to the outside is disclosed in, e.g. Patent Literature 2. This conventional brushless motor comprises the following structural elements:
- a motor housing formed of a first component a part of which has a notch, and a second component covering an opening of the notch; and
- a split grommet for sandwiching the lead-wires.

A first slip of the split grommet sandwiching the lead-wire is engaged with the notch, and a second slip of the split grommet is nipped between the notch and the second component in order to prevent the second slip from dropping. The foregoing structure allows the lead-wires to extend to the outside with ease and allows preventing the lead-wires from being cut by failure.

In the case of the brushless motor disclosed in Patent Literature 1, the circuit board should be held and inserted into the motor housing before the circuit board is fixed to the housing. The workability is thus obliged to lower. For instance, in the case of fixing the circuit board manually inside the housing, a worker who holds the board by hand needs to put his or her hand into the motor housing; however, since an inner diameter of the motor housing is nearly equal to an outer diameter of the circuit board, it is difficult to place the circuit board at the positioning section.

On the other hand, the brushless motor disclosed in Patent Literature 2 has a notch on the motor housing, so that a part of the circuit board can be protruded from this notch, whereby the circuit board can be inserted into the motor housing with the protruding section held. However, since the circuit board protrudes in part from the motor housing, the brushless motor is obliged to be greater in size.

In the case of the brushless motor including a circuit board mounted with a position sensor, when the circuit board is misaligned with respect to the stator, an energizing timing to the stator windings is off in response to this misalignment. This timing-off sometimes varies the energizing timing of individual motors manufactured, which causes dispersion in motor characteristics. A rotating efficiency of the motor lowers depending on a magnitude of the timing-off, and the noises increase. On top of that, in the case of the brushless motor, of which circuit board mounted with a position sensor is sealed in the motor housing, the misalignment cannot be simply corrected because the board is enclosed in the motor housing. The circuit board thus needs to be accurately mounted in the motor housing of such brushless motors as discussed above.

Patent Literature 1: Unexamined Japanese Patent Application Publication No. 2005-341780
Patent Literature 2: Unexamined Japanese Patent Application Publication No. 2009-278801

DISCLOSURE OF THE INVENTION

A brushless motor of the present invention comprises the following structural elements:
- a stator including a stator core wound with windings;
- a rotor disposed rotatably on a rotary shaft;
- a circuit board mounted with a drive control circuit that energizes the windings;
- a board holder disposed on an end face of the stator for holding the circuit board;
- a motor housing having a notch at an opening thereof; and
- a housing cover.

The motor housing accommodates the stator, the rotor and the board holder mounted with the circuit board, and the opening of the motor housing is sealed with the housing cover.

The board holder includes a board mount section to which the circuit board is mounted, and a lead-wire holder for holding a lead-wire extending from the circuit board. The lead-wire holder is disposed at the notch of the motor housing, and the lead-wire is extended from the circuit board mounted to the board mount section to the outside of the motor housing via the lead-wire holder.

The structure discussed above allows inserting the board holder, to which the circuit board is mounted, into the motor housing with the aid of the lead-wire holder and the lead-wire fixed to the lead-wire holder while the lad-wire holder is aligned with the notch of the motor housing. The circuit board can be thus mounted to the motor with ease in the manufacturing steps of the brushless motor, thereby preventing the workability from lowering. On top of that, since the lead-wire holder is aligned with the notch of the motor housing, the positioning of the circuit board is regulated along a circumferential direction, thereby mounting the circuit board accurately with ease.

A method for manufacturing the brushless motor of the present invention is disclosed here. This brushless motor includes a stator including a stator core wound with windings, a rotor disposed rotatably on a rotary shaft, a circuit board mounted with a drive control circuit that energizes the windings, a board holder disposed on an end face of the stator for holding the circuit board, a motor housing having a notch at an opening thereof, and a housing cover. The board holder includes a board mount section to which the circuit board is mounted, and a lead-wire holder for holding a lead-wire extending from the circuit board.

The manufacturing method comprising the following steps:

assembling a board assembled unit in which the circuit board is mounted to the board holder and the lead-wire is held by the lead-wire holder;

fixing the stator in the motor housing;

accommodating the rotor in the motor housing;

inserting the board assembled unit into the motor housing with the lead-wire holder being aligned with the notch; and sealing an opening of the motor housing with the housing cover.

Since the forgoing method includes the step of inserting the board assembled unit into the motor housing with the lead-wire holder being aligned with the notch, the circuit board can be mounted to the motor with ease in the manufacturing process of the brushless motor of the present invention. The workability can be thus prevented from lowering. On top of that, the lead-wire holder is aligned with the notch of the motor housing, thereby regulating the positioning of the circuit board along the circumferential direction. As a result, the accuracy of mounting the circuit board can be obtained with ease.

According to the brushless motor and the method for manufacturing thereof allow mounting the circuit board with ease in the motor housing while the board holder having the circuit board undergoes a regulatory positioning with the aid of the board holder disposed at the notch. As a result, the workability can be prevented from lowering, and the brushless motor maintaining the accuracy of mounting the circuit board is obtainable, and the method of manufacturing the brushless motor is also obtainable.

BRIEF DESCRIPTION OF THE PREFERRED EMBODIMENT

A brushless motor and a method for manufacturing thereof of the present invention are demonstrated hereinafter with reference to the accompanying drawings.

Exemplary Embodiment

Figure 1:
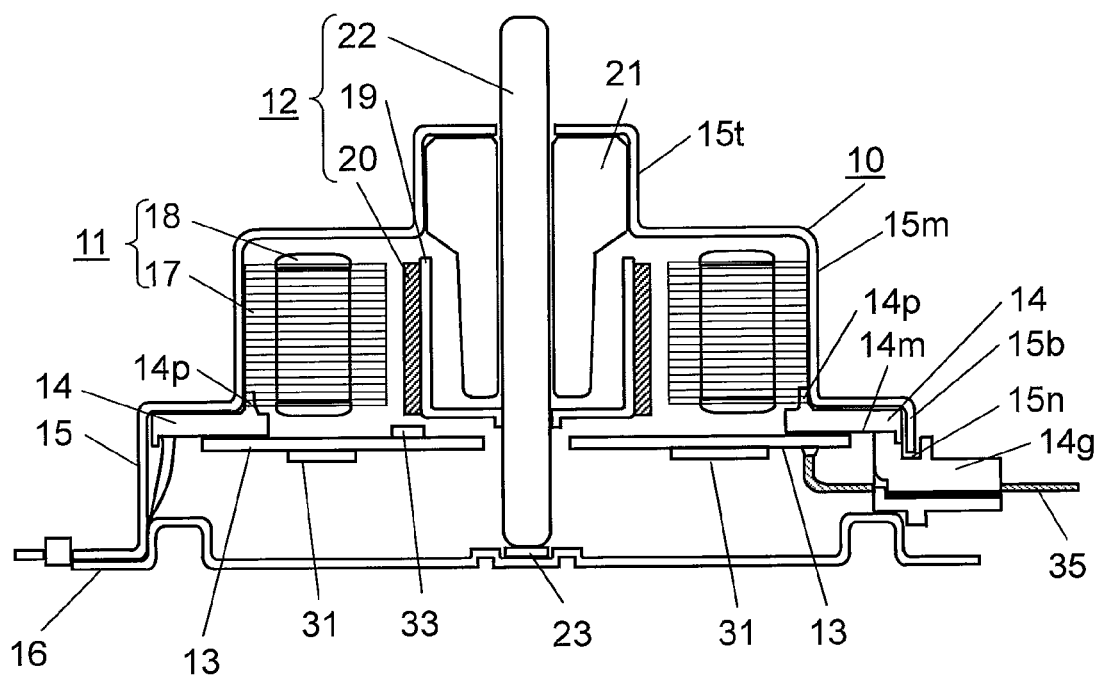
FIG. 1 is a vertical cross sectional view illustrating a structure of a brushless motor in accordance with an embodiment of the present invention.

FIG. 1 is a vertical sectional view of brushless motor 10 in accordance with the embodiment of the present invention. This embodiment refers to an inner rotor type brushless motor in which a rotor is disposed rotatably inside the stator.

As shown in FIG. 1, brushless motor 10 includes stator 11, rotor 12, circuit board 13, board holder 14, motor housing 15, and housing cover 16. Motor housing 15 is made of metal, and is shaped like a three-step cylindrical form having an opening. Motor housing 15 accommodates stator 11, rotor 12, and circuit board 13 mounted to board holder 14 therein and is sealed with housing cover 16 made of metal, whereby brushless motor 10 is formed. In this embodiment, the side where housing cover 16 is disposed is referred to as a bottom side, and the opposite side is referred to as a top side. To be more specific, motor housing 15 is formed of top cylindrical section 15t, middle cylindrical section 15m, and bottom cylindrical section 15b. Bottom cylindrical section 15b has an opening at the underside, and housing cover 16 is mounted to this opening. Motor housing 15 has notch 15n cut away a part of the opening. Notch 15n is detailed later.

Figure 2:
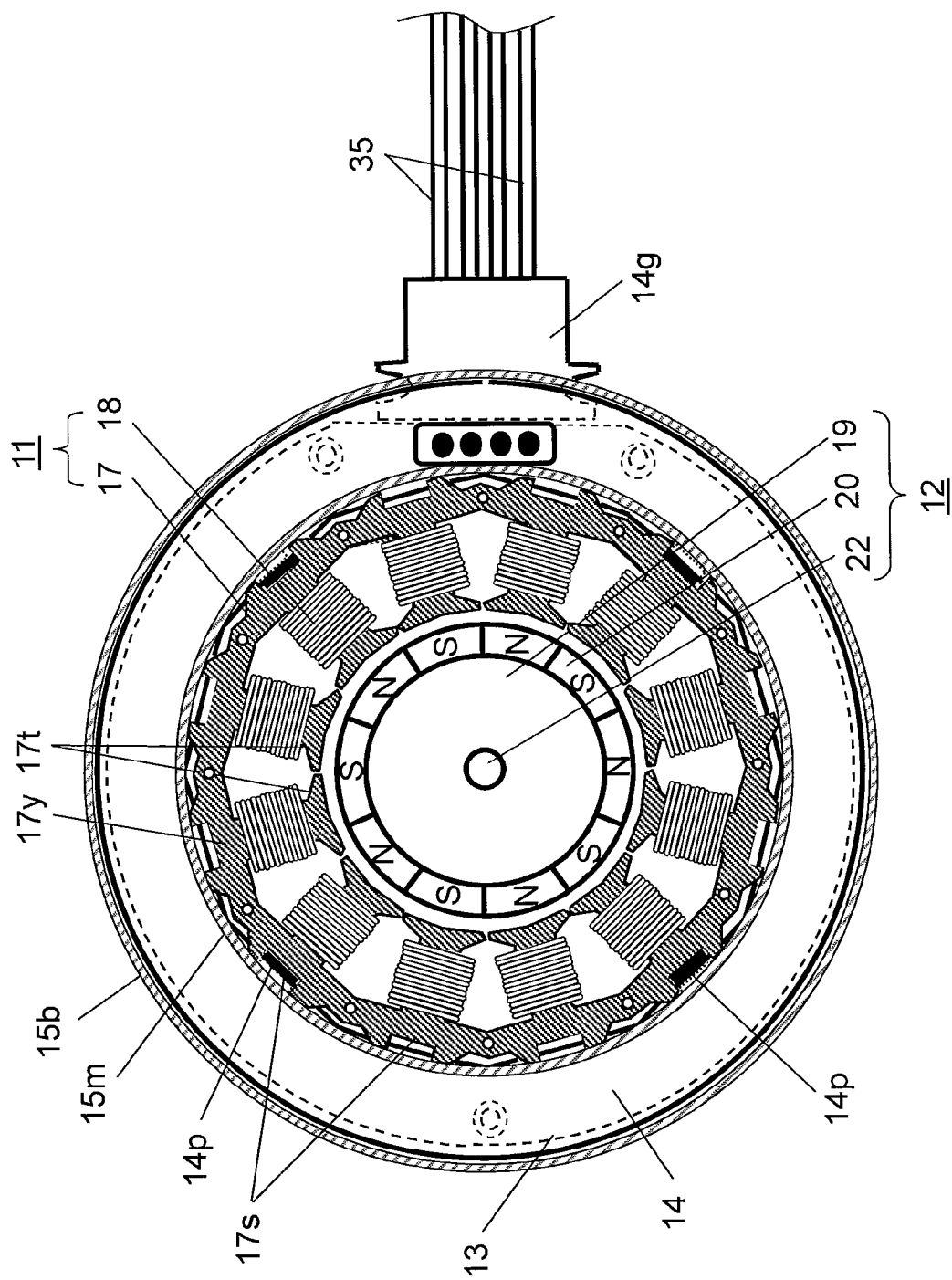
FIG. 2 shows chief structural elements disposed within a motor housing of the brushless motor viewed from the top.
Figure 3:
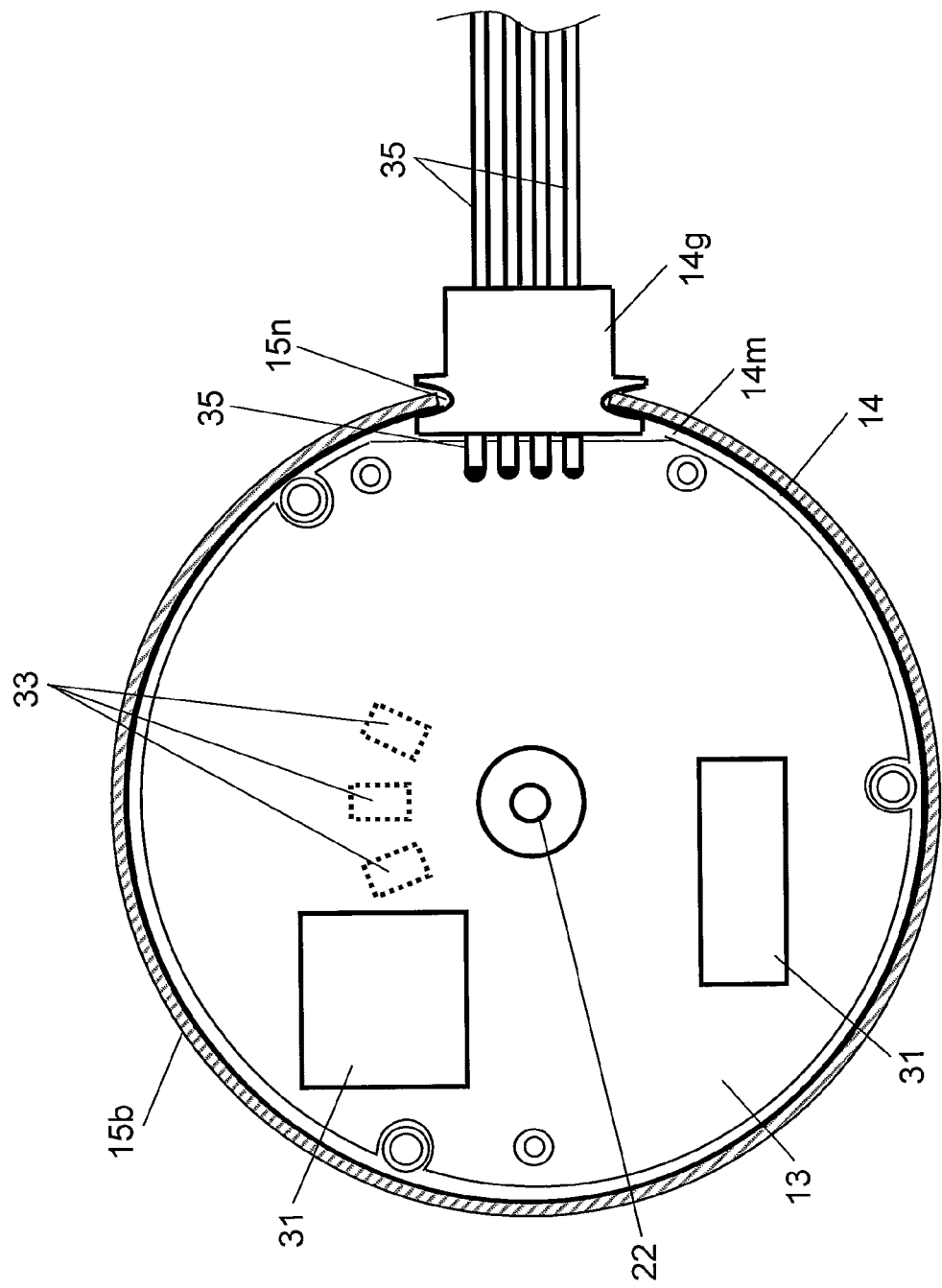
FIG. 3 shows chief structural elements disposed within a motor housing of the brushless motor viewed from the bottom.

FIG. 2 shows chief structural elements disposed within the motor housing of brushless motor 10 viewed from the top. FIG. 3 shows the chief structural elements disposed within the motor housing of brushless motor 10 viewed from the bottom. The whole structure of brushless motor 10 is described with reference to FIGS. 1-3.

As shown in FIGS. 1 and 2, stator 11 is wound with windings 18 corresponding to respective phases. In this embodiment, windings 18 corresponding to three phases, i.e. phases U, V, W shifted in 120 degrees from each other, are wound on stator core 17, which is formed of annular yoke 17y and teeth 17t working as salient poles as shown in FIG. 2. This embodiment refers to an example having teeth 17t in a quantity of 12, namely, the number of salient poles is 12. Stator core 17 as discussed above is rigidly mounted onto an inner wall of middle cylindrical section 15m of motor housing 15 at the outer wall. Each one of teeth 17t projects toward the inside, while teeth 17t form slots between respective teeth 17t and are disposed at equal intervals along the circumferential direction.

Rotor 12 is placed inside stator 11 via a space and rotatably on rotary shaft 22 supported by bearing 21, and it holds cylindrical permanent magnets 20 on the outer wall of rotor frame 19. Bearing 21 is fixed to top cylindrical section 15t of motor housing 15. A first end of rotary shaft 22 is rotatably supported by thrust plate 23 placed at the center of housing cover 16. Rotary shaft 22 extends through bearing 21 and a top face of motor housing 15, so that a second end of rotary shaft 22 projects from the top side of housing 15 for working as an output shaft. Rotor frame 19 is rigidly mounted to rotary shaft 22, and permanent magnets 20 rigidly mounted on the outer wall of rotor frame 19 confront tips of the salient poles of stator core 17. Permanent magnets 20 are magnetized at equal intervals in the circumferential direction such that S-pole and N-pole are alternately placed. Permanent magnets 20 used in this embodiment have 10 poles, i.e. 5 pairs of pair of S-pole and N-pole, in the circumferential direction. Brushless motor 10 in accordance with the embodiment includes 10 poles and 12 slots.

On top of that, brushless motor 10 includes circuit board 13, to which various circuit components 31 are mounted, accommodated in motor housing 15. Circuit components 31 form a drive control circuit for controlling the motor and energizing windings 18. Circuit board 13 is also mounted with three Hall elements 33 corresponding to phases U, V, and W and working as a position sensor for sensing a rotating position of rotor 12.

Circuit board 13 shapes like a disc having a hole at the center, and through which hole rotary shaft 22 penetrates as shown in FIG. 3. Circuit board 13 is mounted to board mount section 14m of board holder 14 which shapes like an annular ring and is disposed on a lateral end face of the bottom of stator 11. To be more specific, as FIG. 2 shows, on the outer wall of stator core 17, slits 17s are formed confronting teeth 17t and along the rotary shaft direction, i.e. in parallel with rotary shaft 22. Multiple projections 14p projecting toward stator core 17 are formed inside board holder 14. Projections 14p are inserted into slits 17s, thereby fixing board holder 14 to stator 11. In this embodiment, stator core 17 is fixed on the inner wall of middle cylindrical section 15m of motor housing 15, whereby a space is formed at a place of each one of slits 17s. Projections 14p are inserted into the spaces defined by middle cylindrical section 15m and slits 17s, whereby board holder 14 is fixed to stator 11. The foregoing structure allows board holder 14 to be fixed more rigidly to stator 11. As FIG. 2 shows, four projections 14p are disposed in slits 17s at given intervals.

Board holder 14 includes lead-wire holder 14g for holding lead-wire 35 extending from circuit board 13 in addition to board mount section 14m to which circuit board 13 is mounted. Motor housing 15 has notch 15n at a part of the opening, and lead-wire holder 14g is disposed at notch 15n. In this embodiment, the foregoing structure allows lead-wire 35 soldered to circuit board 13 at a first end to be extended outside motor housing 15 via lead-wire holder 14g. To be more specific about lead-wire holder 14g, it allows guiding lead-wire 35, extending from board 13 to the bottom side and being bent, such that lead-wire 35 can run along the extending direction and the bending direction and then be pulled from the inside to the outside of motor housing 15 as FIG. 1 shows.

Brushless motor 10 discussed above is manufactured this way:

First, mount circuit board 13 to board holder 14, and form a board assembled unit with lead-wire 35 being held with the aid of lead-wire holder 14g. Then fix bearing 21 to top cylindrical section 15t in motor housing 15, and fix stator 11 to middle cylindrical section 15m in motor housing 15. Next, accommodate rotor 12 and the board assembled unit in motor housing 15. At this time, insert lead-wire holder 14g into notch 15n of motor housing 15 from the opening side, and insert projections 14p of board holder 14 into the spaces defined by middle cylindrical section 15m and slits 17s. The board assembled unit can be thus easily fixed to motor housing 15. Then seal the opening of motor housing 15 with housing cover 16 at which center thrust plate 23 is disposed. Brushless motor 10 with built-in Hall elements 33 and the drive control circuit is thus assembled. Motor housing 15 is made of metal so that a shielding effect can be expected, and the electromagnetic noises radiated from circuit board 13 and stator 11 to the outside can be reduced. Since stator core 17 is directly fixed to motor housing 15, the heat generated by stator 11 can dissipate to the outside through motor housing 15 made of metal.

A power supply voltage and a control signal are supplied from the outside to brushless motor 10 discussed above, then a control circuit and a drive circuit of circuit board 13 supply a drive current to windings 18, and then stator core 17 generates a magnetic field. This magnetic field and the magnetic fields generated by permanent magnets 20 produce attraction force and repulsion force in response to the polarity of those magnetic fields, thereby rotating rotor 12 on rotary shaft 22.

Figure 4:
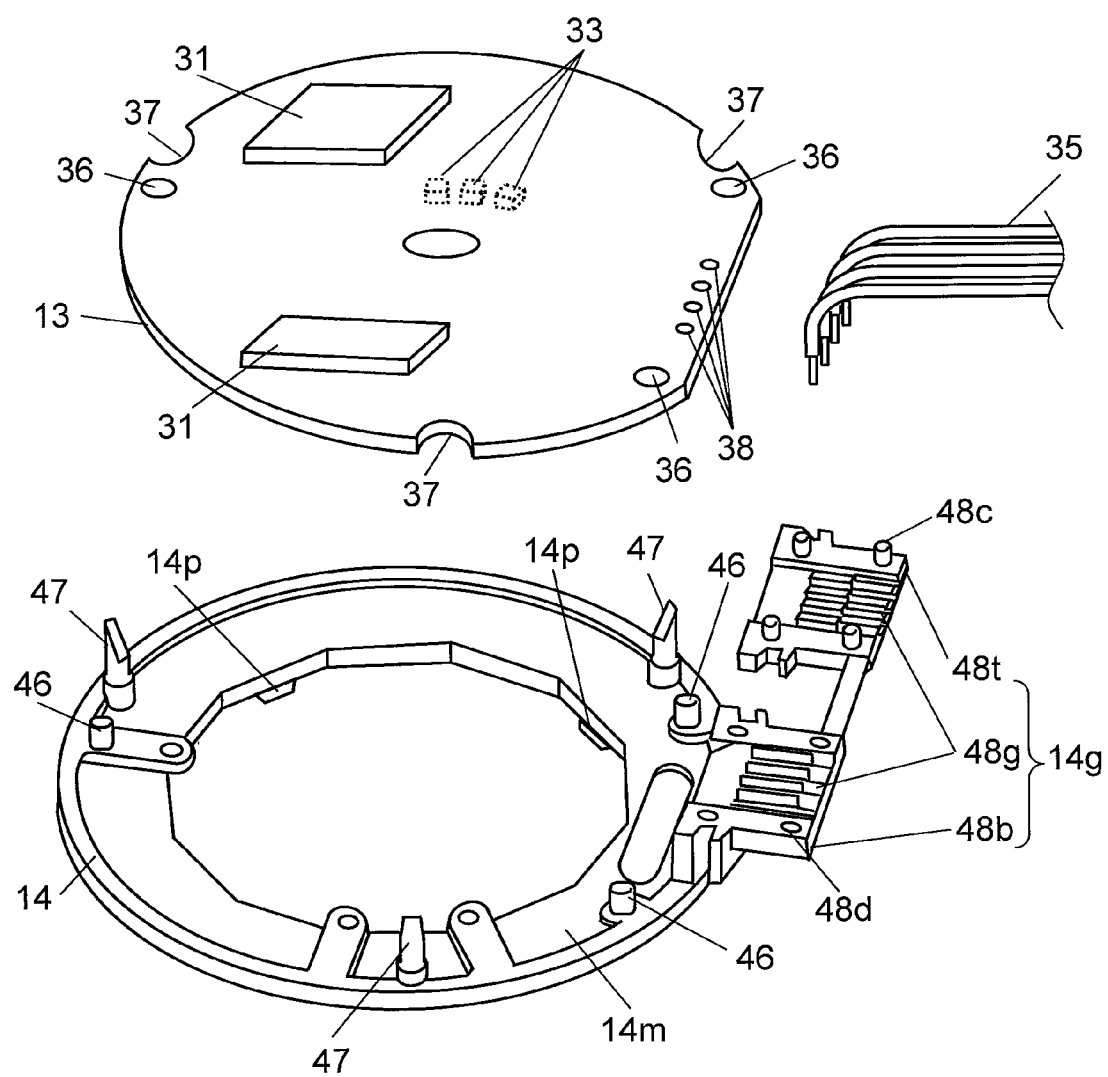
FIG. 4 is a perspective view of a circuit board, board holder, and a lead-wire before they are assembled into a board assembled unit.
Figure 5:
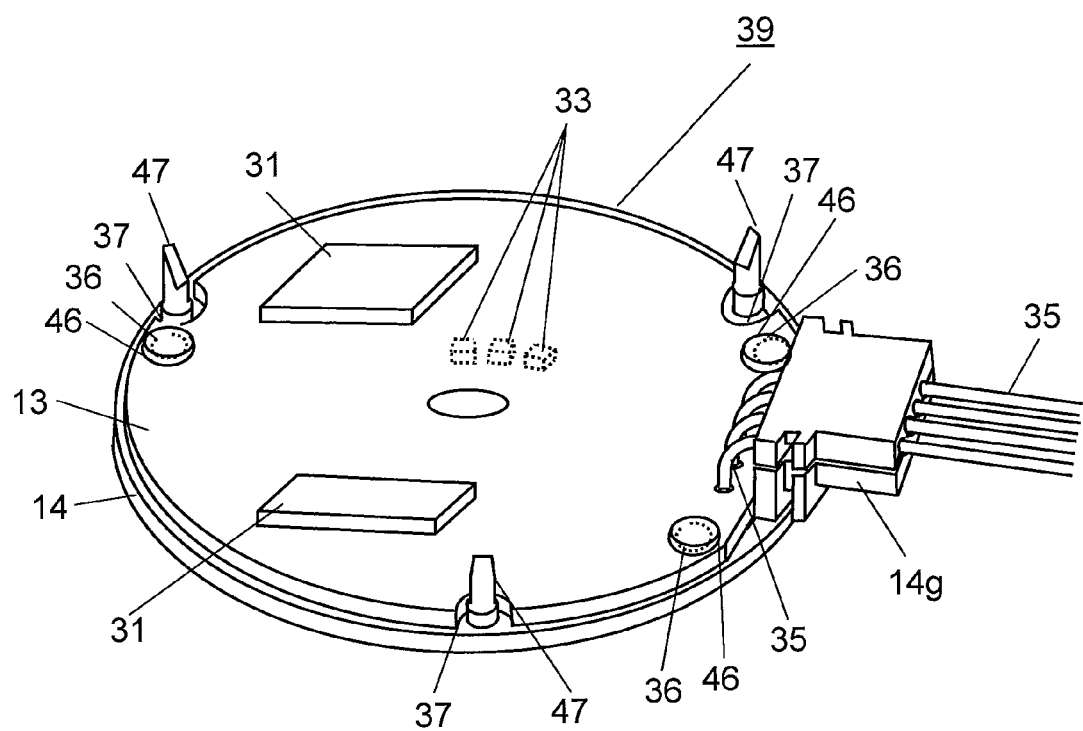
FIG. 5 is a perspective view of a board assembled unit of the brushless motor.

The structure of brushless motor 10 is detailed hereinafter. FIG. 4 is a perspective view of circuit board 13, board holder 14, and lead-wire 35 before they are assembled into a board assembled unit. FIG. 5 is a perspective view of board assembled unit 39 of brushless motor 10. The structure of board assembled unit 39 is detailed with reference to FIGS. 4 and 5.

First, board holder 14 shapes like an annular ring as shown in FIG. 4 and includes lead-wire holder 14g and board mount section 14m to which circuit board 13 is mounted.

On the opposite face to board mount section 14m, multiple projections 14p projecting toward stator 11 are formed for fixing board holder 14 to stator 11. On top of that, board holder 14 has multiple protrusions 46 and multiple projections 47 on the face where board mount section 14m is formed. Protrusions 46 are used for mounting circuit board 13 onto board mount section 14m.

Projections 47 protrude toward the circuit board, namely, in an opposite direction to projections 14p disposed on stator 11 side, i.e. they protrude toward housing cover 16. Projections 47 are used for mounting board assembled unit 39 in motor housing 15. Projections 47 have spring characteristics, and when the opening of motor housing 15 is sealed by cover 16, projections 47 are bent with the spring characteristics being conserved and they are brought into contact with housing cover 16, whereby board assembled unit 39 can be fixed in motor housing 15 while unit 39 is positioned along the rotary shaft direction. In this embodiment, projections 47 are tapered off in order to gain the spring characteristics, which produces force along the rotary shaft direction, thereby holding board assembled unit 39 between stator core 17 and housing cover 16. This structure allows projections 47 to absorb vibrations with the aid of the spring characteristics, so that board assembled unit 39 can be held steadily and for a long term. Circuit board 13 can be positioned along the rotary shaft direction with ease. On top of that, since board assembled unit 39 is held with the aid of the spring characteristics of projections 47, it can be removed with ease when motor 10 is disassembled for a maintenance purpose.

Board holder 14 includes lead-wire holder 14g at an end of board mount section 14m. FIG. 4 shows a structure of lead-wire holder 14g before lead-wire 35 is held by holder 14g. Lead-wire holder 14g includes holder bottom 48b formed at an end of board mount section 14m and holder top 48t for holding lead-wire 35 through engaging with holder bottom 48b. Wire guiding section 48g is formed at respective centers of holder bottom 48b and holder top 48t, and each wire guiding section 48g guides multiple lead-wires 35 running in parallel to each other. In other words, lead-wires 35 are placed such that they run from the inside of board holder 14 toward the outside, i.e. along the guiding direction of wire guiding section 48g with respect to board holder 14 as shown in FIG. 4. Protrusions 48c formed on holder top 48t are fit to recesses 48d formed on holder bottom 48b, thereby sandwiching lead-wires 35 between holder top 48t and holder bottom 48b. Lead-wires 35 can be thus fixed by wire guiding section 48g with lead-wires 35 being guided along the direction from the inside to the outside of board holder 14.

Next, circuit board 13 is shaped like a disc as shown in FIG. 4, and circuit components 31 as well as Hall elements 33 are mounted thereon. Circuit board 13 has multiple holes 36, multiple notches 37, and multiple terminal holes 38.

Holes 36 are used for mounting circuit board 13 to board holder 14. In other words, each one of holes 36 is formed corresponding to each one of protrusions 46, which are then fitted into holes 36, and then protruding portion of protrusion 46 from hole 36 is thermally welded or protrusion 46 is fitted to hole 36, whereby circuit board 13 is mounted onto board mount section 14m of board holder 14. Notches 37 are used for each one of projections 47 to extend through them. To be more specific, projections 47 protruding from board holder 14 protrude over circuit board 13 toward housing cover 16 that is the bottom side when the motor is assembled. Terminal holes 38 are used for connecting lead-wires 35.

Circuit board 13 discussed above, board holder 14, and lead-wires 35 are assembled together into board assembled unit 39 as shown in FIG. 5.

Figure 6:
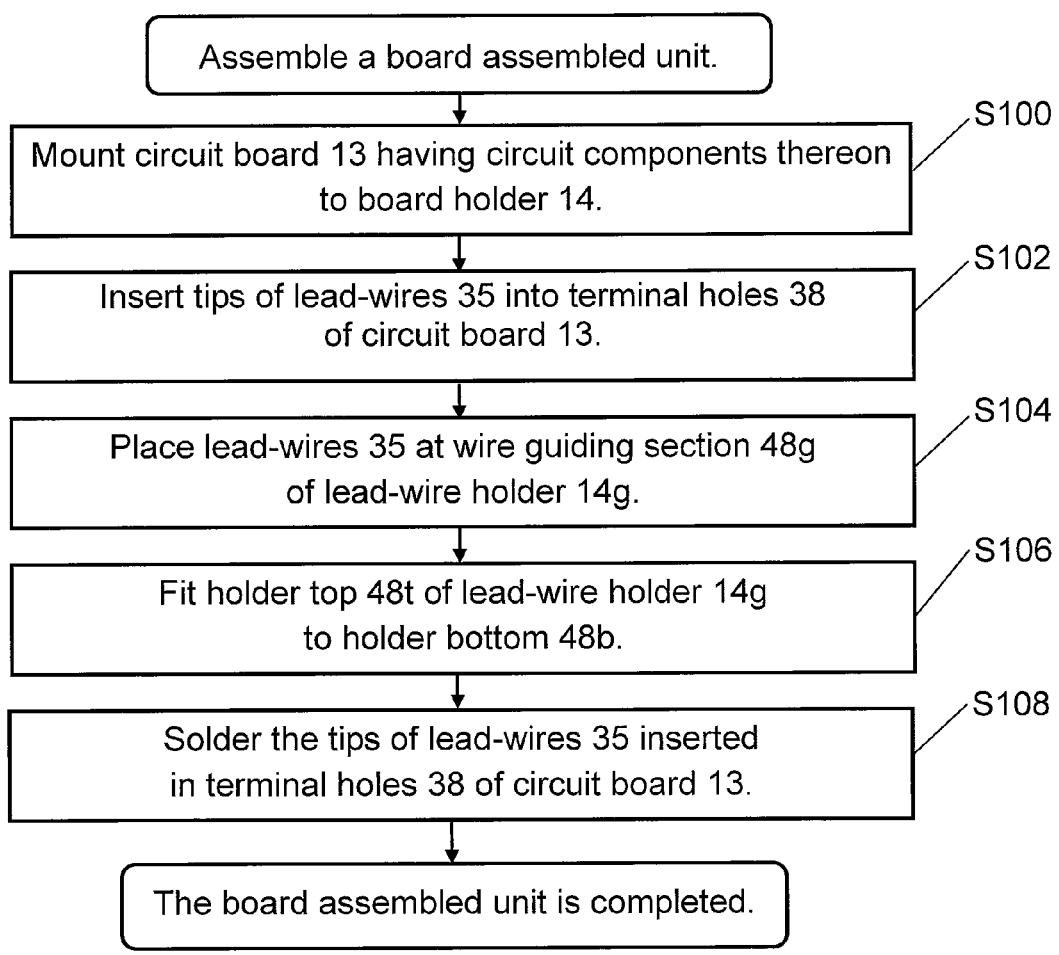
FIG. 6 is a flowchart showing steps of assembling the board assembled unit of the brushless motor.

FIG. 6 is a flowchart showing steps of assembling the board assembled unit 39 of brushless motor 10 in accordance with the embodiment. A method for assembling board assembled unit 39 is demonstrated hereinafter with reference to FIG. 6.

As FIG. 6 shows, mount the circuit board 13 having the circuit components thereon to board holder 14 (step S100). To be more specific, place circuit board 13 above board mount section 14m of board holder 14 such that respective holes 36 are aligned with respective protrusions 46, and then thermally weld protrusions 46 at the projecting portions from holes 36, or fit protrusions 46 into holes 36, thereby mount the circuit board 13 to board holder 14.

Next, insert the tips of lead-wires 35 into terminal holes 38 of circuit board 13 (step S102). Place lead-wires 35 at wire guiding section 48g of lead-wire holder 14g (step S104), and then fit holder top 48t to holder bottom 48b (step S106). These steps allow lead-wires 35 to be guided extending from circuit board 13 toward the outer circumference and to be held by lead-wire holder 14g. Lead-wires 35 are thus fixed to lead-wire holder 14g, and then solder the tips of lead-wires 35 inserted in terminal holes 38 of circuit board 13 (step S108).

Circuit board 13, board holder 14, and lead-wires 35 are integrated together into board assembled unit 39 as discussed above. To be more specific about board holder 14, it is integrally formed of board mount section 14m to be mounted with circuit board 13 and lead-wire holder 14g for holding lead-wires 35. This structure allows positioning with ease the tips of lead-wires 35 at terminal holes 38 of circuit board 13 by using wire guiding section 48g of lead-wire holder 14g. The structure also allows lead-wires 35 to be soldered with lead-wires 35 being fixed to lead-wire holder 14g, so that failures in connection of lead-wires 35 can be prevented. Since the lead-wires 35 are fixed to lead-wire holder 14g, the stress applied to the solder can be lowered, whereby the reliability can be improved. On top of that, not only in manufacturing brushless motor 10, but also in installing brushless motor 10 into a set-product, when a worker handles lead-wires 35 directly by his or her hand, stress cannot be applied directly to the soldered places due to the presence of lead-wire holder 14g. As a result, the soldered places of lead-wires 35 can be free from failures, e.g. cracks when brushless motor 10 is installed into the set-product, thereby maintaining the reliability of the soldered places. As discussed above, board assembled unit 39 is formed by using board holder 14 that is integrally formed of board mount section 14m and lead-wire holder 14g, so that board holder 14 achieves high reliability.

Next, a method for mounting board assembled unit 39 within motor housing 15 is demonstrated hereinafter with reference to FIG. 7, which is a perspective view of board assembled unit 39 and motor housing 15 in accordance with the embodiment.

Figure 7:
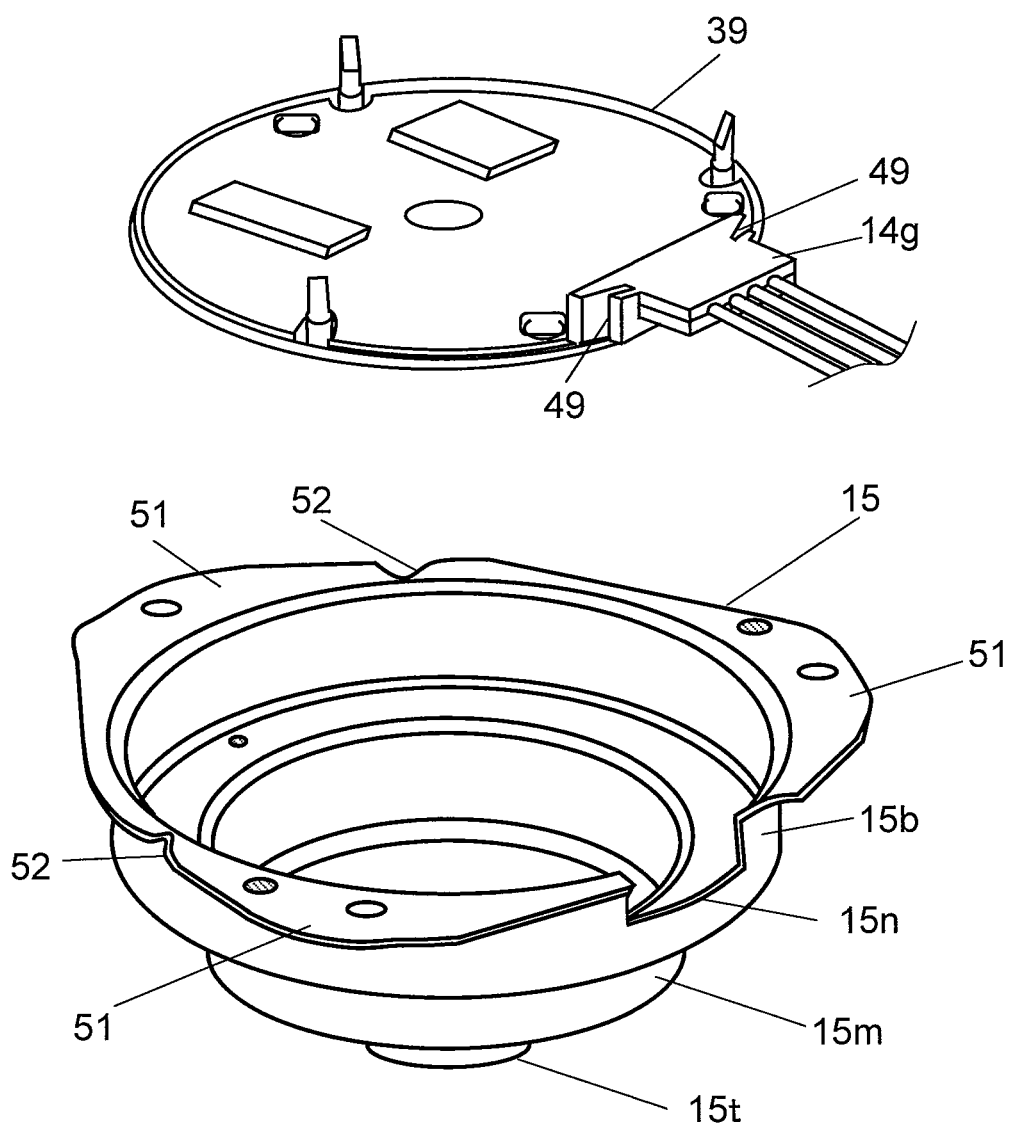
FIG. 7 is a perspective view of the board assembled unit and a motor housing of the brushless motor.

As FIG. 7 shows, motor housing 15 is formed of top cylindrical section 15t, middle cylindrical section 15m, and bottom cylindrical section 15b from top to bottom in this order. Bottom cylindrical section 15b has an opening on the bottom side. Motor housing 15 has housing brim 51 extending from the opening to the outside, and notches 52 are formed on housing brim 51. On top of that, bottom cylindrical section 15b is cut away in part, thereby forming notch 15n with the dimensions such as the width of notch 15n at bottom cylindrical section 15b along the circumferential direction and the height thereof along the rotary shaft direction are almost identical to the width and the height of lead-wire holder 14g of board assembled unit 39. The presence of notch 15n thus allows board assembled unit 39 to be inserted into motor housing 15 with lead-wire holder 14g being aligned with notch 15n. As a result, board assembled unit 39 can be placed with ease in motor housing 15. The alignment of lead-wire holder 14g with notch 15n allows regulating the position of circuit board 13 along the circumferential direction, so that circuit board 13 can be positioned with ease along the circumferential direction. In this embodiment lead-wire holder 14g is provided with grooves 49, which help lead-wire holder 14g be aligned with notch 15n.

The structure discussed above allows board assembled unit 39 to be placed in motor housing 15 this way: Projections 14p are formed on the inner side of board holder 14, and middle cylindrical section 15m and slits 17s of stator core 17 define spaces. In other words, board assembled unit 39 is inserted into motor housing 15 such that lead-wire holder 14g of board holder 14 can be aligned with notch 15n of motor housing 15. Then insert respective projections 14p of board holder 14 into the spaces defined by middle cylindrical section 15m and slits 17s. Board assembled unit 39 is thus fixed to stator 11, and resultantly placed in motor housing 15. As discussed above, board holder 14 of board assembled unit 39 integrates board mount section 14m and lead-wire holder 14g together, and includes projections 14p for fixing board assembled unit 39 to stator 11. This structure allows easily placing board assembled unit 39 in motor housing 15 with the aid of lead-wire holder 14g. On top of that, the board assembled unit 39 can be positioned along the circumferential direction with the aid of lead-wire holder 14g and notch 15n, and also it can be positioned along the circumferential direction with the aid of projections 14p. As a result, board assembled unit 39 can be mounted in motor housing 15 with the positioning accuracy thereof maintained. Misalignment between Hall elements 33 mounted on circuit board 13 and stator core 17 will degrade a position sensing accuracy of Hall elements 33. To overcome this possible problem, the embodiment allows positioning board assembled unit 39 with the aid of projections 14p in addition to the positioning thereof by using lead-wire holder 14g and notch 15n. The accuracy of the positioning along the circumferential direction can be thus obtained. As a result, the accuracy of positional relation between Hall elements 33 and stator core 17 can be maintained, which can prevent the accuracy in position sensing from degrading.

Next, the structures of motor housing 15 and housing cover 16 are detailed hereinafter with reference to FIG. 8, which is a perspective view of motor housing 15 and housing cover 16 of brushless motor 10 in accordance with the embodiment of the present invention.

Figure 8:
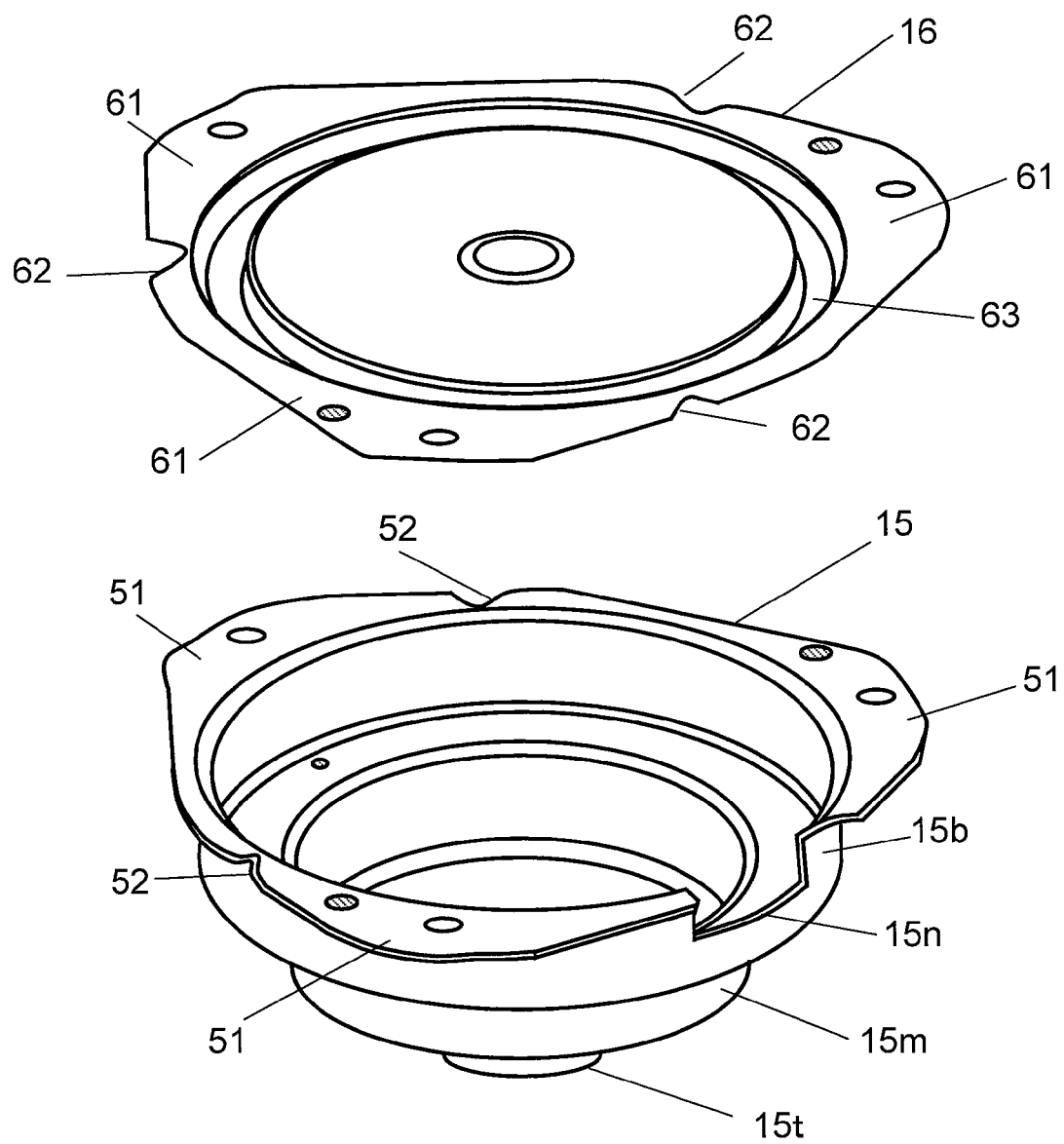
FIG. 8 is a perspective view of the motor housing and a housing cover of the brushless motor.

As FIG. 8 shows, housing cover 16 includes cover brims 61 extending outward, and cover brims 61 have notches 62, and each brim 61 of housing cover 16 shapes in a similar form to housing brim 51 of motor housing 15. Housing cover 16 has an outer diameter approx. equal to an inner diameter of the opening of motor housing 15 and has annular protrusion 63 so that housing cover 16 can fit to the opening of motor housing 15. Insert annular protrusion 63 of housing cover 16 into the opening of motor housing 15 such that the shape of brim 51 can match that of brim 61, whereby motor housing 15 can be sealed by housing cover 16.

At this time, notches 52 of motor housing 15 and notches 62 of housing cover 16 are formed such that they are located differently from each other, and whereby the brims of housing 15 and those of cover 16 can be laid on together. When motor 10 is disassembled for the maintenance, those notches 52 and 62 help the worker in dismantling cover 16 easily. To be more specific, an exposed portion of brim 51 from notch 62 of housing cover 16 is pressed via notch 62 from housing cover 16 side, whereby cover 16 can be removed from housing 15 with ease.

Figure 9:
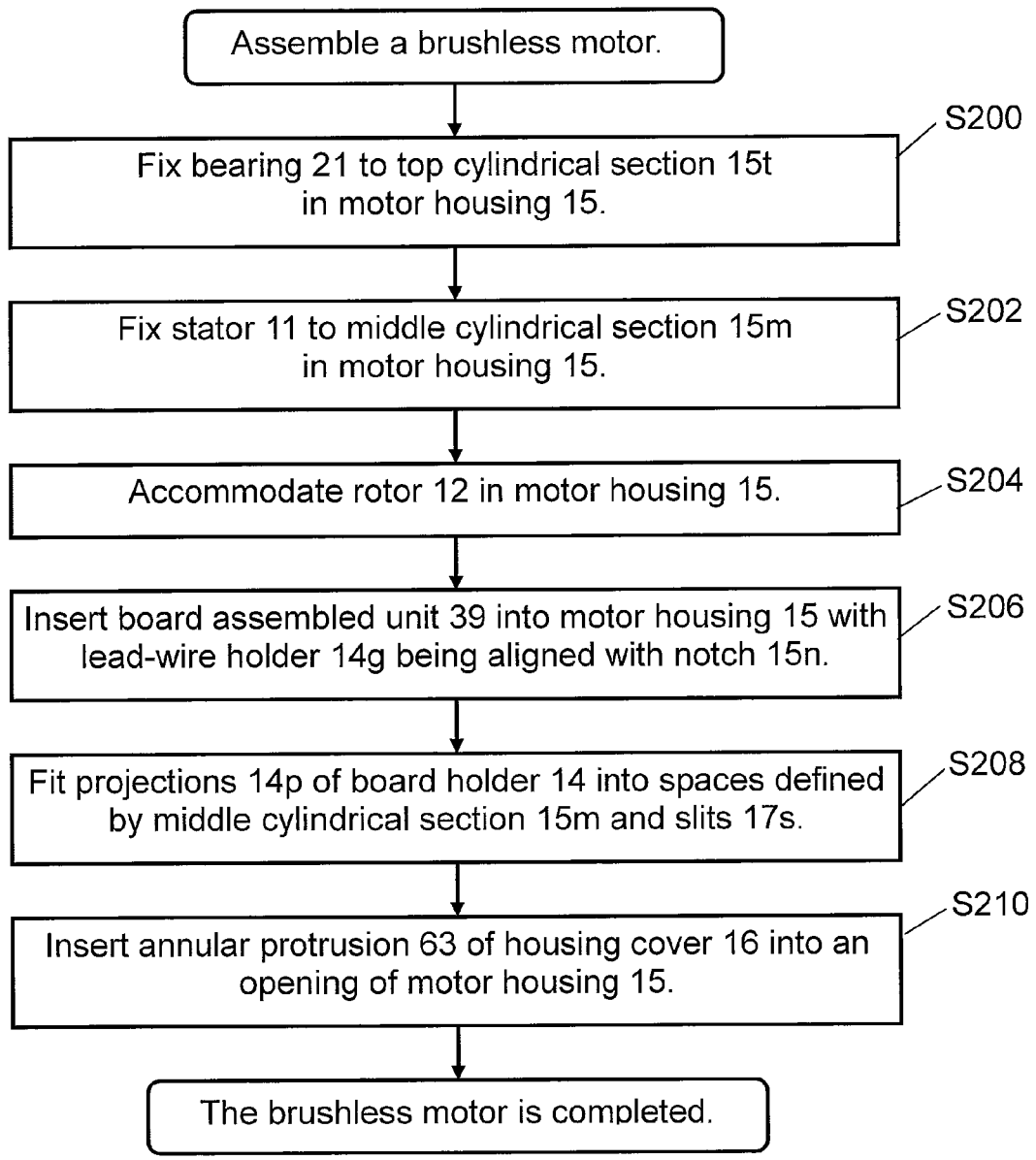
FIG. 9 is a flowchart showing each one of steps for manufacturing the brushless motor.

FIG. 9 is a flowchart showing the steps of manufacturing brushless motor 10 in accordance with the embodiment of the present invention. The manufacturing method of brushless motor 10 including the structural elements discussed above is demonstrated hereinafter.

First, as FIG. 9 shows, fix the bearing 21 to top cylindrical section 15*t* in motor housing 15 (step S200). Next, fix the stator 11 to middle cylindrical section 15*m* in motor housing 15 (step S202), this stator 11 includes stator core 17 wound with wirings 18, and then accommodate rotor 12 in motor housing 15 (step S204).

Then insert the board assembled unit 39 into motor housing 15 with lead-wire holder 14*g* being aligned with notch 15*n* (step S206). Fit respective projections 14*p* of board holder 14 to the spaces defined by middle cylindrical section 15*m* and slits 17*s* (step S208), whereby board mounted unit 39 can be simply placed in motor housing 15 with the positioning accuracy along the circumferential direction maintained.

Finally, insert the annular protrusion 63 of housing cover 16 into the opening of motor housing 15 to seal motor housing 15 (step S210). At this time, motor housing 15 and housing cover 16 are fixed together at a contacting face between the inner circumference of motor housing 15 and the outer circumference of annular protrusion 63. On top of that, projections 47 of board holder 14 are bent by annular protrusion 63, thereby generating pressing force along the rotary shaft direction, and the pressing force allows holding board assembled unit 39 between stator core 17 and housing cover 16. Board assembled unit 39 can be thus simply fixed in motor housing 15 with the positioning accuracy along the rotary shaft direction maintained.

As discussed above, the brushless motor of the present invention includes the board assembled unit that is formed of the board mount section to which the circuit board is mounted, and the lead-wire holder for holding the lead-wares extending from the circuit board. The lead-wire holder is disposed at the notch of the motor housing, and the lead-wires run from the circuit board mounted to the board assembled unit and extends via the lead-wire holder to the outside of the motor housing. This structure allows inserting the board assembled unit, to which the circuit board is mounted, into the motor housing with the lead-wire holder being aligned with the notch of the motor housing with the aid of the lead-wire holder and the lead-wires fixed to the lead-wire holder. As a result, the circuit board can be mounted with ease in the manufacturing steps of the brushless motor, and on top of that, the lead-wire holder is aligned with the notch of the motor housing, thereby regulating the position of the circuit board along the circumferential direction. The brushless motor of the present invention thus allows mounting the circuit board with ease, thereby preventing the workability from lowering as well as achieving a high accuracy of mounting the circuit board.

The brushless motor of the present invention employs a structure where the lead-wire holder sandwiches the lead-wires for guiding them. This structure allows reducing the stress applied to the solder attached to the lead-wires, so that the reliability can be improved.

The brushless motor of the present invention employs a structure where the stator core has multiple slits in the outer wall along the rotary shaft direction and the board holder has multiple projections projecting toward the stator core, and these projections are inserted into the slits. This structure allows positioning the circuit board along the circumferential direction with the aid of the projections, so that the positioning accuracy along the circumferential direction can be maintained. As a result, the circuit board can be mounted in the motor housing accurately, thereby preventing the position sensing accuracy from lowering.

The brushless motor of the present invention employs a structure where the board holder has multiple protrusions protruding toward the housing cover, and these protrusions have spring characteristics. This structure allows the protrusions to absorb vibrations because of their spring characteristics, so that the circuit board can be held steadily and for a long time.

The brushless motor of the present invention employs a structure where the motor housing has the housing-brims extending from the opening to the outside, and the housing cover has also the cover-brims extending from the joint with the opening to the outside. The housing brims and the cover brims include notches respectively, and the housing brims are laid on the cover brims while the housing notches are shifted from the cover notches, whereby the opening is sealed with the housing cover. This structure allows the housing cover to be dismantled with ease when the brushless motor is disassembled for the maintenance.

The method for manufacturing the brushless motor of the present invention comprises the steps of:

assembling the board assembled unit through mounting the circuit board to the board holder and having the lead-wire holder hold the lead-wires;

fixing the stator in the motor housing;

accommodating the rotor in the motor housing; and inserting the board assembled unit into the motor housing with the lead-wire holder being aligned with the notch; and sealing the opening of the motor housing with the housing cover.

Since this method includes the step of inserting the board assembled unit into the motor housing while the lead-wire holder is aligned with the notch, the circuit board can be mounted with ease in the manufacturing steps of the brushless motor. On top of that, the alignment of the lead-wire holder with the notch of the motor housing allows regulating the position of the circuit board along the circumferential direction. As a result, the manufacturing method of the present invention allows mounting the circuit board with ease, and preventing the workability from lowering, and also maintaining the mounting accuracy of the circuit board.

In the manufacturing method of the brushless motor of the present invention, the stator core has multiple slits in the outer wall along the rotary shaft direction, and the board holder has multiple projections projecting toward the stator core. The manufacturing method further includes the step of fitting the multiple projections into the slits after the insertion of the board assembled unit into the motor housing. This method allows the circuit board to be positioned accurately along the circumferential direction with the aid of the projections. As a result, the circuit board can be mounted accurately and the position sensing accuracy can be prevented from lowering.

The method for assembling the board assembled unit includes the steps of:
mounting the circuit board to the board mount section;
inserting the tips of lead-wires into the terminal holes of the circuit board;
holding the lead-wires at the lead-wire holder; and
soldering the tips of the lead-wires inserted into the terminal holes of the circuit board.

This method allows soldering the lead-wires while the lead-wires are fixed to the lead-wire holder, so that the tips of lead-wires can be positively soldered, whereby failures in lead-wires connection can be prevented.

Brushless motor 10 of the present invention includes motor housing 15 made of metal, and stator core 17 directly fixed to motor housing 15. As discussed previously, this structure allows dissipating the heat produced in stator 11 to the outside via motor housing 15. It is thus possible to dissipate the heat, produced by circuit components 31 mounted on circuit board 13, through motor housing 15.

Figure 10:
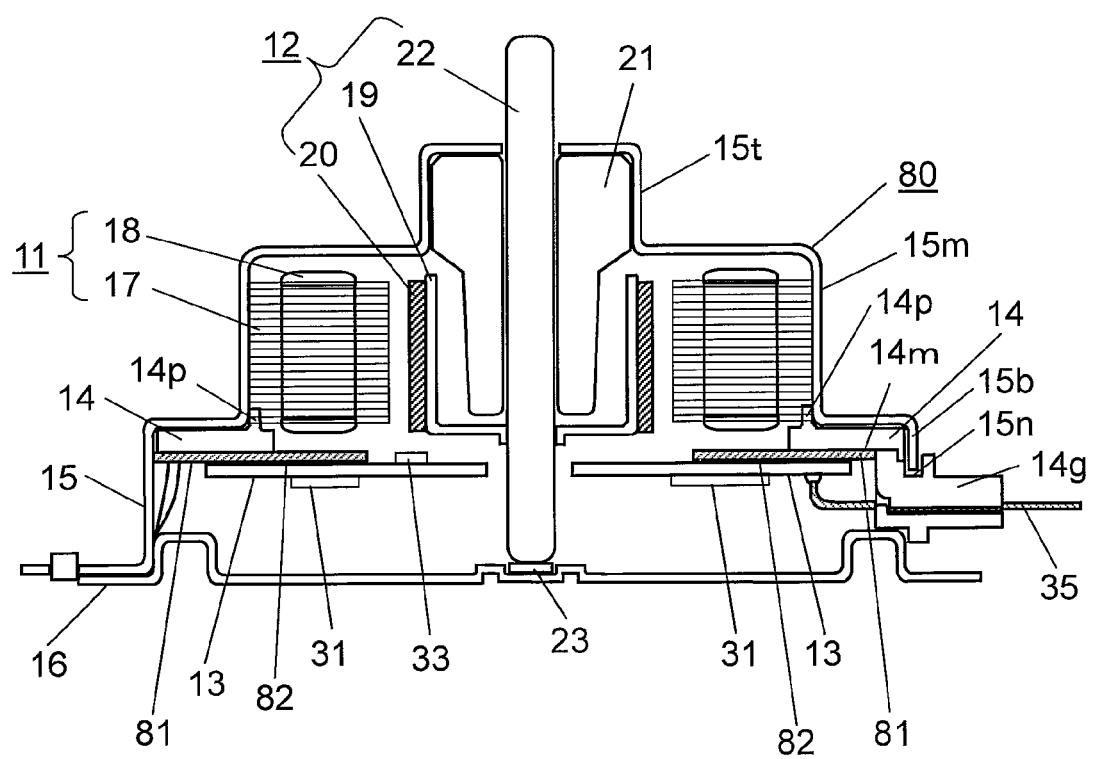
FIG. 10 is a vertical cross sectional view of a modified example of the brushless motor.

FIG. 10 is a vertical sectional view of a modified brushless motor in accordance with the embodiment, and this modified example has the structure for dissipating the heat produced by components 31. Modified brushless motor 80 shown in FIG. 10 includes, e.g. annular metal plate 81 and insulating sheet 82 between board mount section 14m of board holder 14 and circuit board 13 in addition to the structural elements of brushless motor 10 shown in FIG. 1. To be more specific, firstly place metal plate 81 on board mount section 14m, and then place insulating sheet 82 thereon, and dispose circuit board 13 on insulating sheet 82. Metal plate 81 is brought into contact with the inner wall of brushless motor 80 at an end section. Insulating sheet 82 is inserted in order to avoid a short circuit of circuit board 13 due to the presence of metal plate 81. Metal plate 81 preferably has excellent heat dissipating properties from the standpoint of heat dissipation, e.g. aluminum. In other words, metal plate 81 is preferably made of light metal having a high heat conductivity. Insulating sheet 82 preferably has highly heat dissipation properties and is preferably as thin as not thicker than 0.5 mm from the standpoint of heat dissipation and downsizing.

Brushless motor 80 thus allows mounting circuit board 13 to board holder 14 via metal plate 81 and insulating sheet 82, and board holder 14 is placed inside motor housing 15 such that metal plate 81 can be brought into contact with the inner wall of motor housing 15. This structure allows the heat produced by circuit components 31 mounted on circuit board 13 to travel to motor housing 15 and to dissipate outside of housing 15.

The board assembled unit discussed above allows the circuit board to be mounted with ease and with accuracy. On top of that, the structure allows the heat, produced by the circuit components mounted, to dissipate outside effectively.

INDUSTRIAL APPLICABILITY

The brushless motor and the method for manufacturing thereof of the present invention prevent the workability from lowering, and allow the circuit board to be mounted accurately. The present invention is thus useful for the brushless motors to be used in home electrical appliances and electrical equipment, and also useful for the manufacturing method thereof.

The invention claimed is:
1. A brushless motor comprising:
a stator including a stator core comprising teeth arranged at regular angular positions and wound with windings;
a rotor disposed on a rotary shaft for rotation with the rotary shaft;
a circuit board mounted with a drive control circuit that energizes the windings;
a board holder disposed on an end face of the stator for holding the circuit board;
a motor housing having an opening at a bottom end of the motor housing and a notch formed at the bottom end of the motor housing; and
a housing cover configured to close the opening of the motor housing,
wherein the motor housing accommodates therein the stator, the rotor and the board holder to which the circuit board is mounted,
wherein the board holder includes a board mount section to which the circuit board is mounted, and a lead-wire holder that is integrally formed with the board mount section at a peripheral end of the board mount section for holding a lead-wire extending from the circuit board,
wherein the lead-wire holder is restricted in the notch of the motor housing by means of its engagement with the notch,
wherein the lead-wire extends from the circuit board mounted on the board mount section to outside the motor housing via the lead-wire holder fixed by the lead-wire holder, and
wherein the stator core includes a plurality of circumferentially arranged slits formed in a radially outer wall of the stator core along a rotary shaft direction at the same angular positions as teeth of the stator core, and the board holder includes a plurality of circumferentially arranged projections projecting in the shaft direction toward the stator core and each sized nearly equal in a circumferential direction to the slit, and the projections are inserted into and in direct contact with the slits to fix the board holder to the stator core in the circumferential direction.

2. The brushless motor of claim 1, wherein the lead-wire holder comprises a holder top and a holder bottom placed together to sandwich the lead-wires between them for guiding the lead-wires.

3. The brushless motor of claim 1, wherein the outer wall of the stator core is securely attached to an inner wall of the motor housing, and the projections are inserted into spaces defined by the inner wall of the motor housing and the slits of the stator core formed in the outer wall of the stator core.

4. The brushless motor of claim 1, wherein the board holder includes a plurality of circumferentially arranged elastic projections projecting toward the housing cover, and the projections of the board holder are in press-contact with the housing cover to thereby securely position the board holder in the motor housing.

5. The brushless motor of claim 1, wherein the motor housing includes a plurality of housing brims extending at angular intervals from the bottom end of the motor housing perpendicularly to the rotary shaft direction, and the housing cover includes a plurality of cover brims extending at the angular intervals in parallel to and in contact with the housing brim, the plurality of housing brims and the plurality of cover brims being shaped similarly to each other and aligned with each other at the same circumferential positions; and
wherein the plurality of housing brims comprises a notch between adjacent two housing brims at a first angular position, and the plurality of cover brims comprises a notch between adjacent two cover brims at a second angular position different from the first angular position so that there is no overlap between the notches of the housing brim and the cover brim.

6. The brushless motor of claim 1, wherein the circuit board is mounted to the board holder with a metal plate and an insulating sheet layered together between the circuit board and the stator core and sandwiched between the circuit board and the board holder, and the board holder is disposed in the motor housing so that the metal plate is brought into contact with an inner wall of the motor housing.

* * * * *